(12) United States Patent
D'Andrea

(10) Patent No.: US 6,206,699 B1
(45) Date of Patent: Mar. 27, 2001

(54) ACTIVITY BOOK WITH EXTRUDABLE ILLUSTRATION FEATURE

(76) Inventor: Deborah D'Andrea, 110 Twin Oaks Rd., Akron, OH (US) 44313

( * ) Notice: Subject to any disclaimer, the term of this patent is extended or adjusted under 35 U.S.C. 154(b) by 0 days.

(21) Appl. No.: 09/328,630

(22) Filed: Jun. 9, 1999

Related U.S. Application Data

(60) Provisional application No. 60/044,578, filed on Apr. 29, 1997.

(51) Int. Cl.$^7$ .............................. G09B 11/00; A63H 33/38
(52) U.S. Cl. ......................... 434/81; 434/258; 434/428; 218/22; 218/38; 446/147
(58) Field of Search ...................................... 434/381, 170, 434/176, 236, 258, 237, 428; 281/22, 38; 446/147, 151, 152; 40/406

(56) References Cited

U.S. PATENT DOCUMENTS 2,489,240 * 11/1949 Meyer .
2,538,085 * 1/1951 Cotton .
4,176,473 * 12/1979 Rae .
5,573,438 * 11/1996 D'Andrea .............................. 446/149

* cited by examiner

*Primary Examiner*—Sam Rimell
*Assistant Examiner*—Bera B. Miller
(74) *Attorney, Agent, or Firm*—Oldham & Oldham Co., LPA

(57) ABSTRACT

The present invention is directed to an activity book designed to make reading more enjoyable and educational for young readers. The activity book of the present invention comprises at least one illustrated page with at least one opening on the page through which a moldable material such as modeling clay is forced or extruded by the reader as through a die. The moldable material is forced through the opening(s) by the reader compressing the illustrated page against an area located on a hard flat surface such as a table or another page of the book. The moldable material passing through the opening(s) completes the illustration on the page. The shape of the opening(s) compliments the illustration and facilitates the completion of the illustration when a moldable material is extruded through the opening.

17 Claims, 3 Drawing Sheets

ACTIVITY BOOK WITH EXTRUDABLE ILLUSTRATION FEATURE

This application claims benefit to U.S. provisional application Serial No. 60/044,578, filed Apr. 29, 1997.

FIELD OF INVENTION

The present invention relates to children's books and more particularly to an activity book for young readers designed to make reading more enjoyable and educational. The book of the present invention preferably includes illustrations on at least some of the pages thereof. The children's book of the present invention allows the reader to complete illustrations on the pages of the book by compressing pages of the book so as to force modeling clay, dough, modeling compound (such as PLAY DOUGH®) or other moldable material through openings in the page.

BACKGROUND OF INVENTION

Encouraging children to read has always been a concern of society. As school and work become increasingly competitive, the importance of encouraging children to read at a young age has increased.

Many different types of books have been designed to make reading more enjoyable for young readers. For example, there are books that allow the reader to see his or her image superimposed on the pages thereof. Other books are designed to play music or make animal sounds. Activity books are also known which encourage children to read by allowing them to interact with the book in a way that relates to the theme or plot of the book. However, parents and educators are continuously looking for new ways to encourage young readers.

Children's books have traditionally focussed on educating the young reader. Typically children's books have drawn on the basic themes relating to teaching fundamental skills such as counting and shape or size recognition. Few books provide the child with the opportunity to develop creativity and find motor skills through the effort and ultimate accomplishment of the child interacting with the book. Currently available children's activity books do not offer the young reader a vehicle for developing skills related to sculpting and fashioning three-dimensional designs as part of the reading experience.

SUMMARY OF INVENTION

The present invention is therefore directed to an activity book designed to make reading more enjoyable and educational for young readers. The activity book of the present invention comprises at least one illustrated page with at least one opening on the page through which a moldable material such as modeling clay is forced or extruded by the reader through the opening in the page as through a die. The moldable material is forced through the opening(s) by the reader compressing the illustrated page against an area located on a hard flat surface such as a table or another page of the book. The moldable material passing through the opening(s) completes the illustration on the page.

It is therefore an object of the present invention to provide young readers with an illustrated activity book which requires the child to manually transform a moldable material into a shape or design suitable to complete an illustration on the page.

It is further object of the present invention to provide an illustrated activity book with at least one opening on the illustrated page(s) so that the shape of the opening(s) compliments the illustration and facilitates the completion of the illustration when a moldable material is extruded through the opening.

These and other objects and advantages of the invention, as well as the details of illustrative embodiments, will be more fully understood from the following specification and drawings.

DETAILED DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

Figure 1:
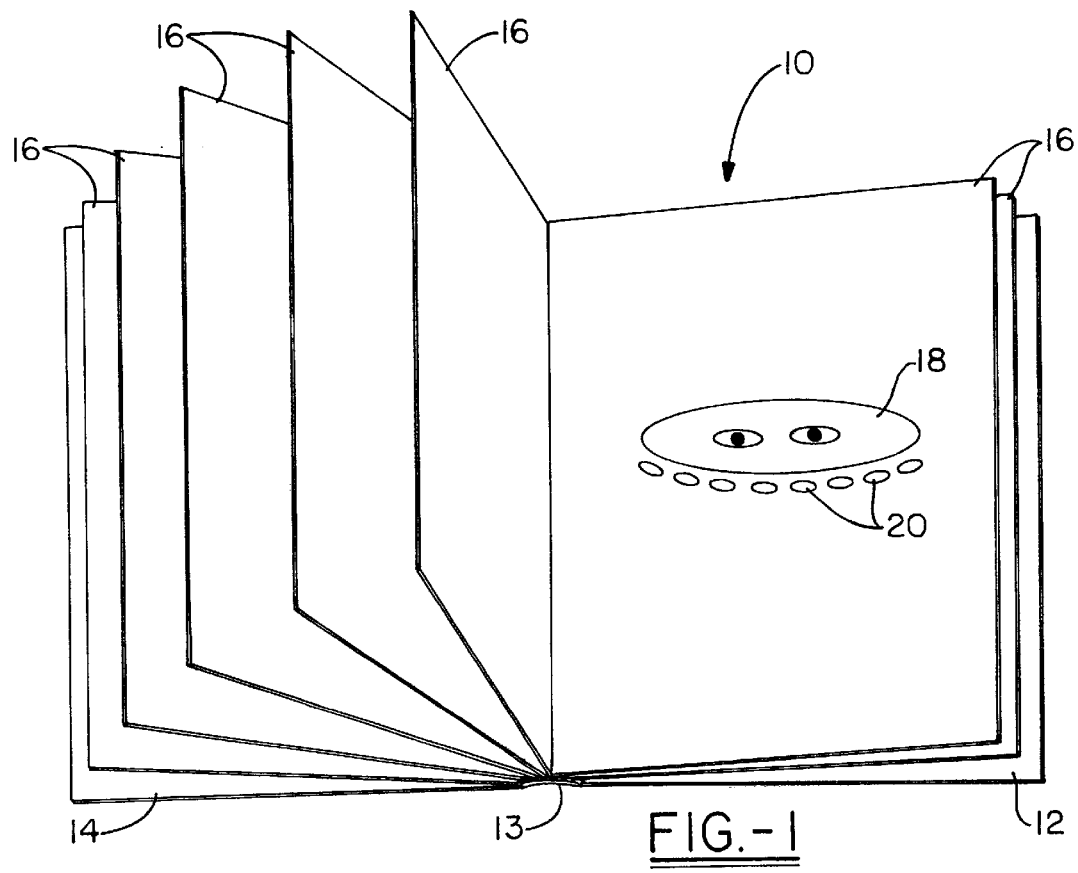
FIG. 1 pictorially illustrates an embodiment of a book in accordance with the present invention prior to the moldable material completing the illustration shown on the page.

A book in accordance with the present invention is shown generally at 10 in FIG. 1 and comprises one or more pages 16 bound together in book form by a binding 13. Binding 13 may be formed in any suitable manner known in the book binding art. For example, a spiral wire binding or an adhesive may be used to bond the various pages 16 of book together. Book 10 is contemplated for use by children and as such, book 10 may be manufactured to withstand some amount of mistreatment. For example, pages 16 of book 10 may be formed from relatively heavy paper stock or hard plastic so that the pages 16 will resist tearing. Also, a front cover 14 and a rear cover 12 are preferably provided.

Figure 2:
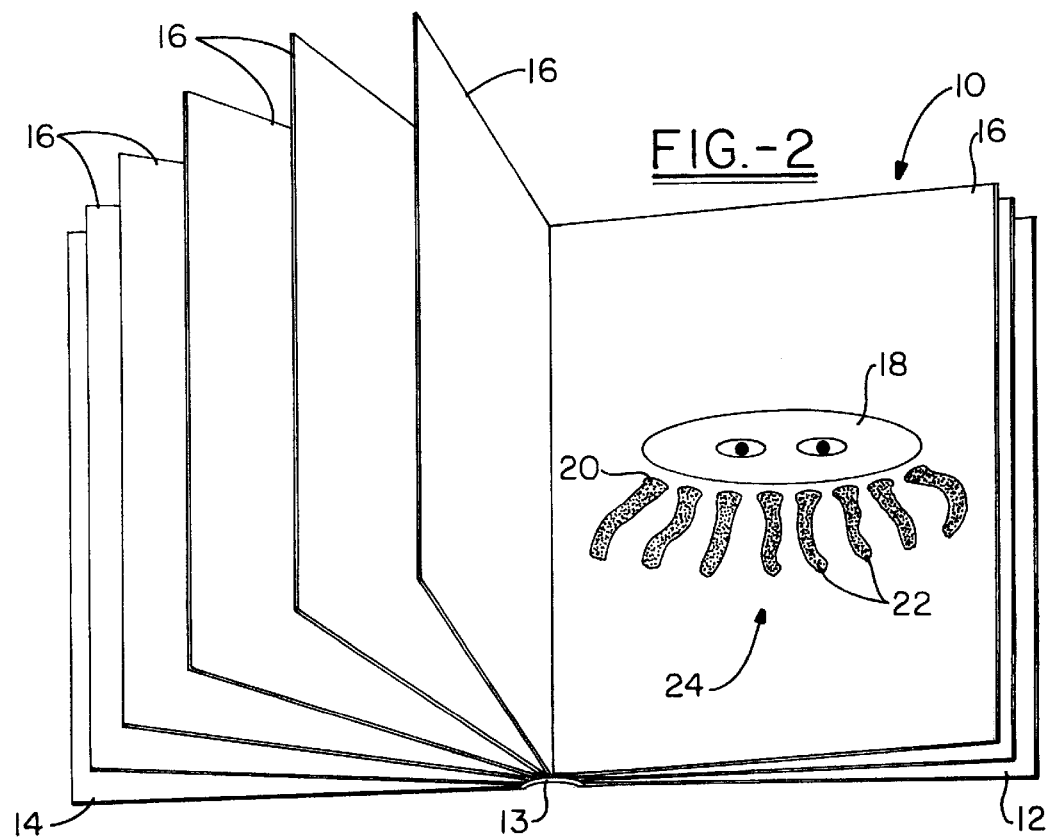
FIG. 2 pictorially illustrates an embodiment of a book in accordance with the present invention after forcing a moldable material through the openings in the page to complete an illustration.

At least one of the pages 16 of book 10, and preferably a plurality of pages 16 include an illustration 18 printed, painted, or otherwise disposed on at least a portion thereof. Any illustration 18 may be utilized and the invention is not meant to be limited to the examples shown in the figures. The illustration 18 may also be accompanied by text in accordance with the theme or plot of the book. Further incorporated into the illustration 18 is at least one hole or opening 20 in the page 16. The hole or opening 20 is preferably an integral part of illustration 18. The hole or opening 20 is designed to allow a moldable material 22 such as modeling clay, dough, modeling compound such as PLAY DOUGH® or any other suitable material to pass, the resulting extruded three-dimensional image 24, thereby completing the illustration 18 as shown in FIG. 2. In a preferred embodiment, moldable material 22 is non-toxic and otherwise safe for handling by young readers.

Figure 3A:
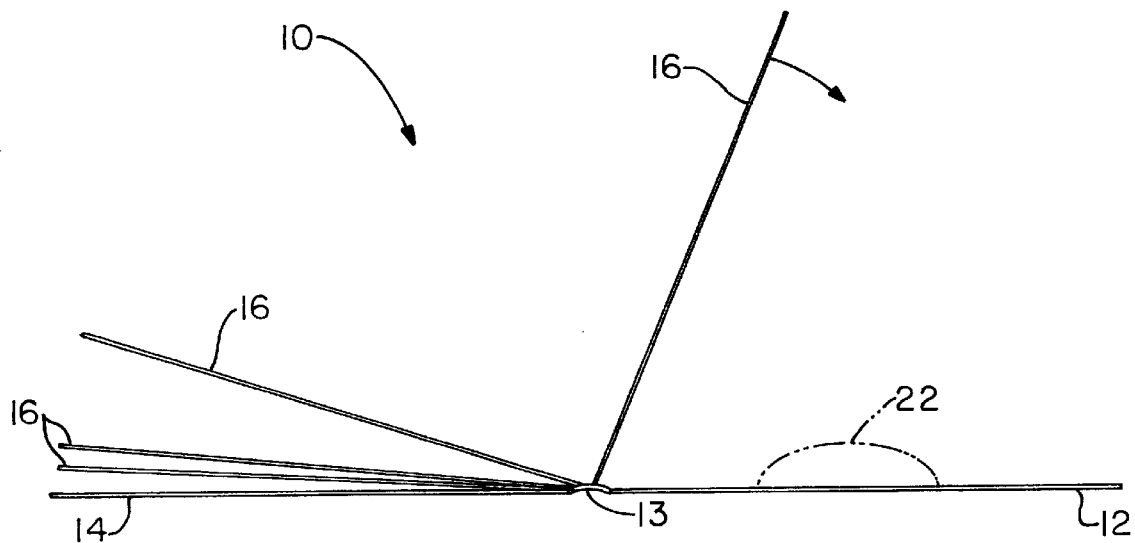
FIG. 3A is an edge view of an activity book in accordance with an embodiment of the present invention.

As depicted in FIG. 3A, moldable material 22 is placed on rear cover 12, front cover 14 or page 16. The child reader then turns or rotates the page 16 so as to squeeze or otherwise compress the back of the page 16 containing the illustration 18 against the cover or page on which moldable material 22 is placed. The squeezing or compressing causes the moldable material 22 to be forced or extruded through hole or opening 20 transforming the moldable material 22 into a three-dimensional shape which compliments and completes illustration 18.

Figure 3B:
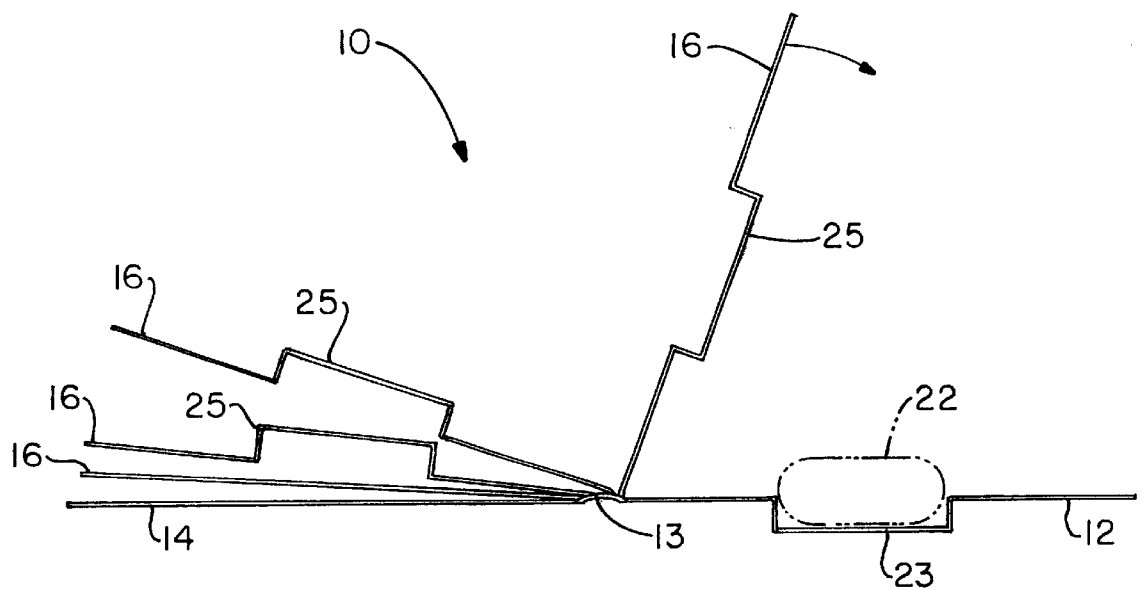
FIG. 3B is an edge view of an activity book in accordance with an embodiment of the present invention in which a recessed area is incorporated for preventing spreading of the moldable material during compression of the pages.

An alternative embodiment, shown in FIG. 3B, discloses a recessed area 23 for receiving moldable material 22. Recessed area 23 serves to prevent the moldable material 22 from spreading across the page during the extrusion. It is also contemplated that the moldable material 22 may be held in containers and the entire container may then fit into recessed area 23. Another embodiment of the invention shown in FIG. 3B includes a hollowed illustration area 25 upon which the illustration 18 is printed, painted or otherwise disposed and which operates in concert with recessed area 23 to prevent the spreading of moldable material 22. The hollowed illustration area 25 fits into the recessed area 23 so that any moldable material 22 initially contained in recessed area 23 is forced to extrude through holes or openings in the illustration 18 and is not spread across the page or cover of the book.

The materials used in the construction of an activity book in accordance with the present invention must be washable and sufficiently resistant to adhering to moldable material 22. It is contemplated that any such material may be used, however preferred materials include bard plastic or heavy bond paper or cardstock coated with a smooth, non-stick laminate. The interior of the holes or openings 20 may also be coated with a non-stick coating so as to prevent the moldable material 22 from sticking while passing through.

Holes or openings 20 may be of any cross sectional shape including, but not limited to, ovals, rectangles, triangles, stars, hearts or crosses. It is also contemplated that holes or openings 20 may have a cross-sectional shape corresponding to an outline or profile of a figure in the illustration. Illustrations 18 with their accompanying holes or openings 20 are particularly amenable to incorporation into the activity book of the present invention when the illustrations 18 include hair or fur, legs, arms, antennae, stems or any other feature which can be characterized as growing or extending out of the page 16. It is also to be understood that moldable material 22 may be colored so as to coordinate with the illustration 18 to be completed.

Figure 4:
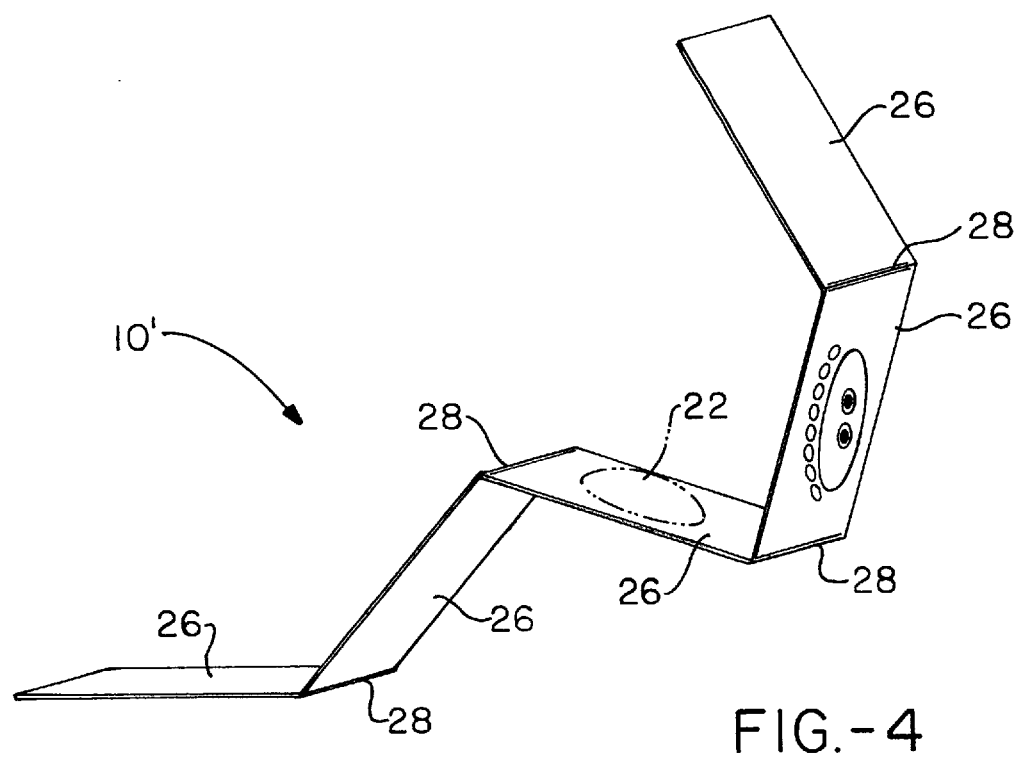
FIG. 4 pictorially illustrates an alternative embodiment of an activity book in accordance with the present invention.
Figure 5:
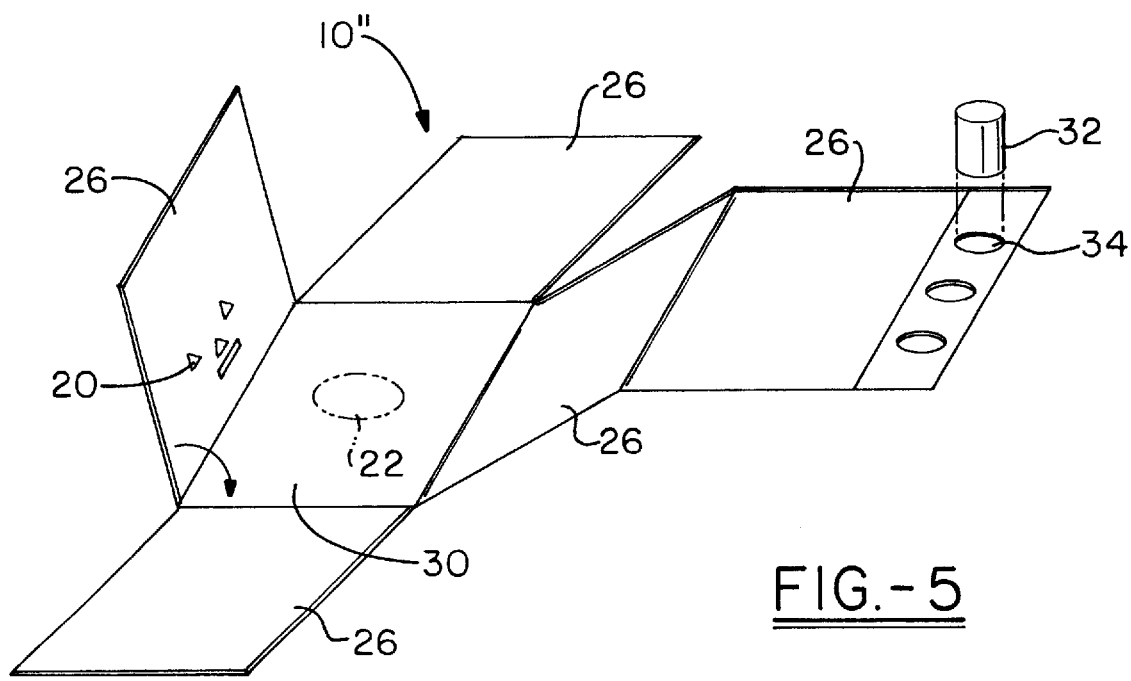
FIG. 5 pictorially illustrates an alternative embodiment of an activity book in accordance with the present invention which opens from a central page.

An alternative embodiment 10' of an activity book in accordance with the present invention is shown in FIG. 4. This embodiment is characterized by the folding of the book as an accordion with each page 26 sharing a common edge 28 with at least one but less than all other pages 26. This embodiment also contemplates an activity book 10" which opens from a central page 30 as shown in FIG. 5. Central page 30 is characterized as sharing a common edge with four other pages 26. Pages 26 may also share a common edge with pages other than central page 30. Moldable material 22 may be placed for extrusion on any page sharing an edge with a page having an illustration 18 and holes or openings 20. Other variations in book construction are contemplated as within the spirit of the invention, including but not limited to books with detachable pages or cards. It is also contemplated that moldable material 22 may be placed for extrusion on a hard plastic sheet, or other protective sheet, which is then slipped between the illustration-containing pages of the book. The hard plastic sheet is then used as a base for squeezing or compressing the moldable material 22.

Packaging of the activity book of the present invention may also include packaging of moldable material 22, although the invention is not limited to any particular packaging arrangement and is also intended to include an activity book for which moldable material 22 is packaged and sold separately. When packaging the moldable material 22 along with the activity book, it is envisioned that moldable material 22 initially contained in small plastic cylinders 32 may be packed along the periphery of rear cover 12, front cover 14 or any other page in apertures 34 as demonstrated in FIG. 5.

Other embodiments and variations to the preferred embodiments described herein will be apparent to those skilled in the art and may be made without departing from the spirit and scope of the invention as defined in the above Description.

What is claimed is:

1. An activity book, comprising:
   a set of bound pages at least one page of which has at least one illustration thereon;
   an amount of moldable material;
   at least one opening in at least one of said pages, said at least one opening corresponding to a part of said at least one illustration; and
   an area adjacent to at least one said page in which said moldable material is placed, wherein said moldable material is extruded through said opening such that said moldable material is transformed into a three dimensional shape thereby forming part of said at least one illustration.

2. An activity book as recited in claim 1, wherein said area is on a page of said set of bound pages.

3. An activity book as recited in claim 1, wherein said set of bound pages is made of plastic.

4. An activity book as recited in claim 1, wherein said moldable material is a member selected from the group consisting of: modeling clay, dough, and modeling compound.

5. An activity book as recited in claim 1, wherein said area adjacent to at least one said page in which said moldable material is placed includes a recess.

6. An activity book as recited in claim 5, wherein said at least one page further comprises a hollowed illustration area corresponding said recess.

7. An activity book as recited in claim 5, wherein said moldable material is held in a container, said container having a size and shape corresponding to said recess.

8. An activity book as recited in claim 1, wherein said area is coated with a non-stick coating.

9. An activity book as recited in claim 1, wherein each page of said set of bound pages shares a common edge with less than every other page of said set of bound pages.

10. An activity book as recited in claim 9, wherein at least one page of said set of bound pages shares a common edge with four other pages.

11. An activity book as recited in claim 1, wherein at least one page of said set of bound pages is detachable from said set of bound pages.

12. An activity book as recited in claim 1, further comprising a plastic sheet insertable adjacent said at least one page, wherein said area for placing a moldable material is on said plastic sheet.

13. An activity book as recited in claim 1, wherein said set of bound pages is made of heavy bond paper.

14. An activity book as recited in claim 1, wherein said set of bound pages is coated with a non-stick laminate material.

15. An activity book as recited in claim 1, wherein said moldable material is held in at least one container.

16. An activity book as recited in claim 15, wherein at least one page of said set of bound pages contains at least one aperture for holding said at least one container.

17. A method of completing an illustration on a page of a book, comprising the steps of:

placing a moldable material on a first page of said book; and turning a second page of said book, said second page having an illustration and at least one opening thereon, so as to compress said second page against said moldable material and extrude said moldable material through said at least one opening, thereby transforming said moldable material into a three-dimensional shape which completes said illustration.

* * * * *